(No Model.) 2 Sheets—Sheet 1.

E. M. TOUSLEY.
BINDING ATTACHMENT FOR HARVESTERS.

No. 283,935. Patented Aug. 28, 1883.

Witnesses
V. D. Stockbridge
Alex Scott

Inventor.
Edgar M. Tousley (No Model.) 2 Sheets—Sheet 2.

E. M. TOUSLEY.
BINDING ATTACHMENT FOR HARVESTERS.

No. 283,935. Patented Aug. 28, 1883.

Witnesses:
Wm A. Rosenbaum
Warren C. Stone

Inventor.
Edgar M. Tousley

UNITED STATES PATENT OFFICE.

EDGAR M. TOUSLEY, OF ALBION, NEW YORK.

BINDING ATTACHMENT FOR HARVESTERS.

SPECIFICATION forming part of Letters Patent No. 283,935, dated August 28, 1883.

Application filed January 24, 1883. (No model.)

*To all whom it may concern:*

Figure 1:
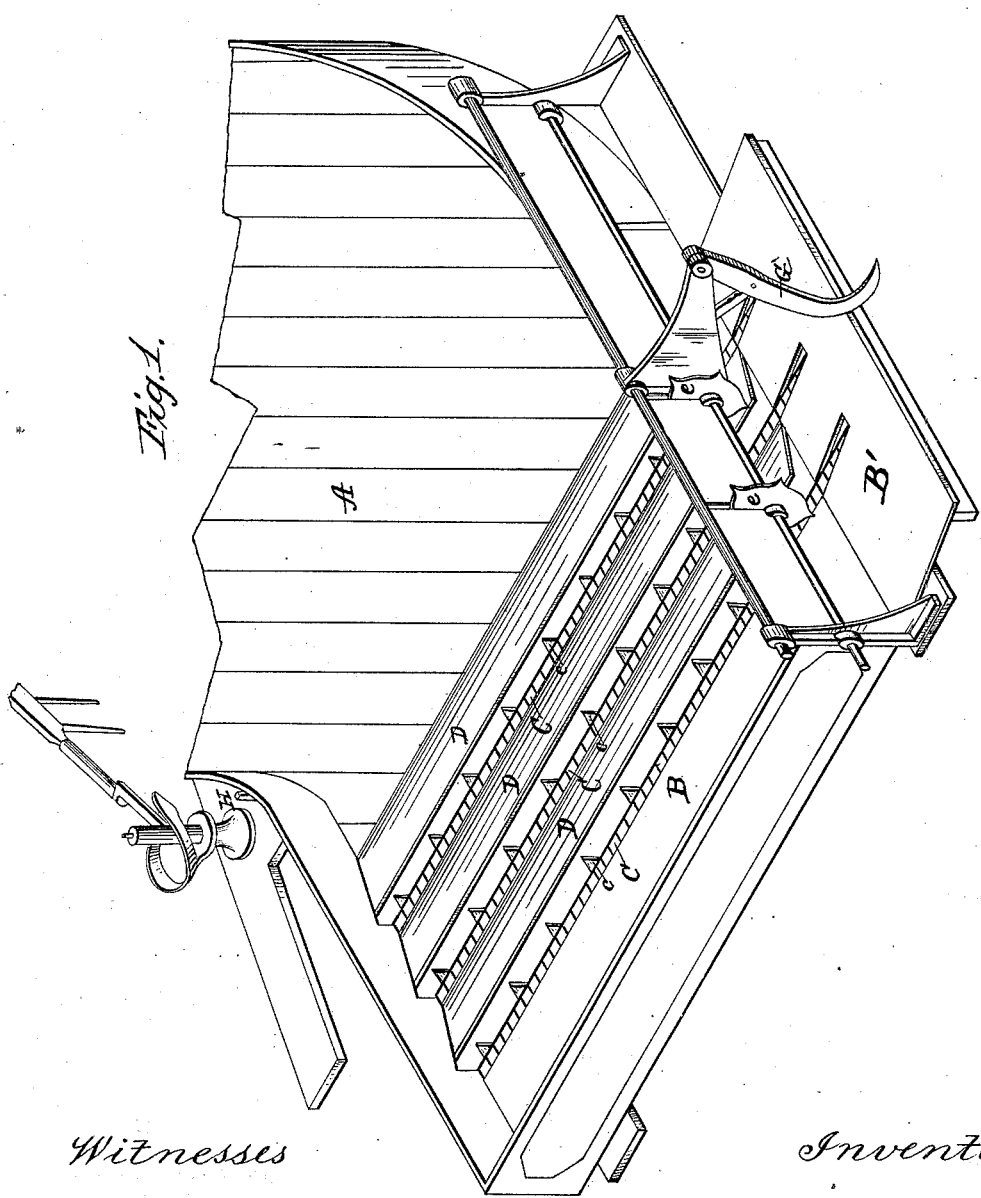
Figure 2:
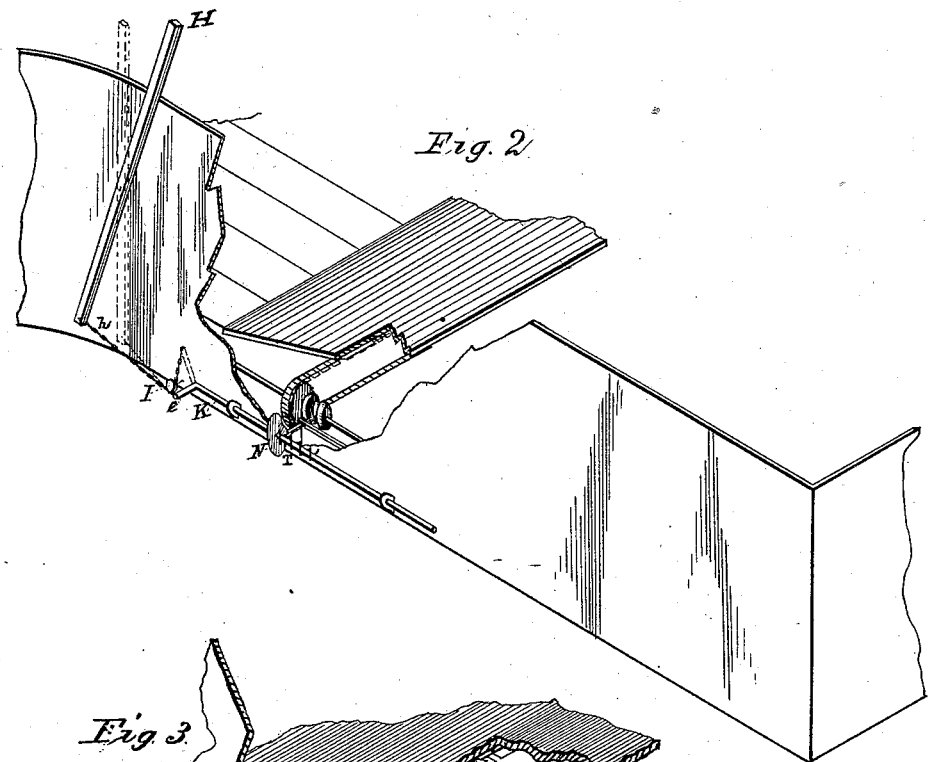

Be it known that I, EDGAR M. TOUSLEY, of Albion, county of Orleans, and State of New York, have invented certain new and useful Improvements in Binding Attachments for Harvesters, of which the following is a full, clear, and exact description, reference being had to the annexed drawings, forming a part of this specification, in which—
Figure 1 is a perspective of a part of a reaper-platform with the carrying-platform and binder-table attached, showing the drop-leaves which constitute a part of my invention. Fig. 2 is a view from the inner edge or side of the platform, showing one means for dropping and raising what I have here denominated "drop-leaves." Fig. 3 is a detached and enlarged view of a part of the leaf-operating mechanism.

My invention relates to improvements in that class of harvesting-machines which have a sweep-rake, a side delivery, and a supplemental carrier-frame.

The object of my invention is to provide an effective means for intermittingly transferring the grain endwise in gavels from the harvester-platform without tangling or interfering with the teeth of the carriers, notwithstanding said carriers have a continuous movement; and to this end my invention consists, first, in the connection with the frame-work of the harvester-platform of a carrier-frame comprising certain boards or leaves, which, being tilted, as hereinafter described, elevate the grain above the tops of the carrier-teeth, and constitute guards for said teeth, so that said teeth may travel without acting on the grain until it is desired to carry the gavel forward to the binder.

Figure 3:
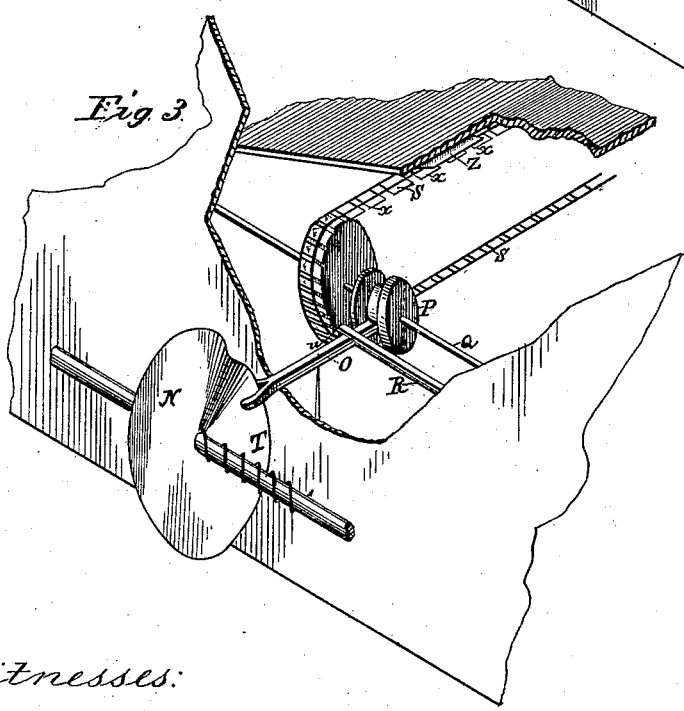

My invention consists, further, in the details of mechanism for operating the drop-leaves at the proper time, as shown in Figs. 2 and 3, and which will hereinafter be described, and more particularly pointed out in the claims.

A is the harvester-platform, B the carrier-platform, and B' the binder-table.
C C C are carrier-chains mounted in a frame, B, and *c c c* are the teeth thereof.

D D D are what I here designate as "drop-leaves." These leaves are pivoted to the carrier-platform at their edges nearest the harvester-platform, and swing up and down at their opposite edges in distance about equal to the length of the carrier-teeth. When the edges of the leaves are elevated, they form slight inclines, upon which the grain is swept or carried by the usual harvester-rake, and whereon it freely lies above the tops of the teeth and out of their reach, and when the leaves are dropped or drawn down the carriers move the grain toward the binding-table, and within control of the binding mechanism, in the usual way.

*e e* are continuously-revolving packers, which gather and in a measure compart the grain, and bring it within a compass suitable for the final compression, which occurs in the act of binding.

G is the binder-arm, and is operated in a well-known manner, not necessary to describe in this connection.

The means for operating the drop-leaves of the carrier-platform are illustrated in Figs. 2 and 3, and consist of a pivoted lever, H, a chain, *h*, a pulley, I, rock-shaft K, with arm or lever *l*, said rock-shaft carrying a cam-disk, N, a forked pivoted lever, O, a clutch, P, mounted and continuously moving with shaft Q, which in my machine operates the grain-carrier, a stop or catch, R, on the carrier-frame, an endless chain, S, suitably mounted, said chain being provided with projections *x* from the side of the chain for about one-half its length, and a cam or shoe, *z*, attached to the under side of the leaves. The shaft Q has at intervals along its length a sprocket-wheel, a clutch, and clutch-shipping mechanism, and a leaf-raising chain for each leaf. The chains are arranged near the free edges of the leaves, longitudinally of the frame and parallel with the carrier-chains, so that the projections *x* on the chains will operate upon the shoes which depend from the lower fans of the leaves.

The operation is as follows: At the will of the operator, one of the arms or sweeps of the rake is caused to trip or move the lever H, or it may be moved by hand to the position shown, which, through the chain *h*, passing over pulley I, rocks the shaft K and cam-disk N, which in turn vibrates lever O, and said lever throws clutch P, which is fixed to the shaft, into gear with the loosely-mounted sprocket-wheel, and which carries chain S, and causes them to carry the projections x from under shoe z, and thereby drop the leaves below the projecting teeth of the carrier. On the chain S there is a point, u, extending beyond the projections x, which, as it comes around in its movement, lifts the stop or catch R, whereupon the disk N, operated by spring T, throws the clutch out of connection with the sprocket-wheel, and the chain stops until started by the tripping of lever H, as before described. The arrangement of projections is such that the leaves are dropped just after the lever is tripped, and remain down during one-half the traverse of carrier-chains, so that the platform will be cleared by the carrier before the leaves are again raised.

The means for operating the drop-leaves may be varied indefinitely without departing from the first part of my invention, the essential characteristic of which is a carrying-frame such as described, to conduct the grain onto the binder-attachment platform without entanglement or interference with the carrying devices.

It should be observed in this connection that a platform with slats may be combined with a single leaf or slip and caused to rise and fall bodily, and thus operate to elevate the grain above the tops of the carrier-teeth, in substantially the same way that it is done with my drop-leaves, without departing from the spirit of my invention.

Having thus fully described my invention, what I claim as new, and desire to secure by Letters Patent, is—

1. In a harvester, the combination of a sweep-rake adapted to move the grain endwise, a supplemental frame, drop-leaves hinged thereto, and means for causing said leaves to rise and fall, substantially as specified.

2. The combination, with a sweep-rake harvester, of a carrier-frame provided with a moving grain-carrier, and means, substantially as described, for supporting a gavel which is being moved endwise over the tops of the carrier-teeth, and then dropping said gavel upon the carriers, as and for the purposes specified.

3. In a grain-binding harvester, the combination of a sweep-rake, a carrier-frame interposed between the harvester and binder platforms, and having rising and falling leaves and traveling carrier-chains, substantially as described.

4. The mechanism herein described for tilting the leaves, consisting, essentially, in the combination of the tripping-lever, the cam-disk, the clutch, the sprocket-wheel, the chain having projections u, and the stop or pawl R.

5. The combination of the chain or belt having the described projections and the pivoted leaves provided with the shoe, for the purpose set forth.

6. The combination of the sprocket-wheel, the chain provided with the stop tripping projection u, the clutch, and the stop R, and means, substantially as shown, for throwing the clutch out of engagement with the sprocket-wheel, as specified.

EDGAR M. TOUSLEY.

Witnesses:
    WARREN C. STONE,
    WM. A. ROSENBAUM.